US012800901B2

(12) United States Patent
Greenfield

(10) Patent No.: US 12,800,901 B2
(45) Date of Patent: Nov. 17, 2026

(54) SYSTEMS AND METHODS FOR IMAGING AND ANALYZING A MICROSCOPIC SAMPLE

(71) Applicant: ViveSense, Inc., New Rochelle, NY (US)

(72) Inventor: Jules Benjamin Greenfield, New Rochelle, NY (US)

(73) Assignee: ViveSense, Inc., New Rochelle, NY (US)

( * ) Notice: Subject to any disclaimer, the term of this patent is extended or adjusted under 35 U.S.C. 154(b) by 227 days.

(21) Appl. No.: 18/146,296

(22) Filed: Dec. 23, 2022

(65) Prior Publication Data

US 2023/0204935 A1 Jun. 29, 2023

Related U.S. Application Data

(60) Provisional application No. 63/293,142, filed on Dec. 23, 2021.

(51) Int. Cl.
*G02B 21/36* (2006.01)
*G01N 1/38* (2006.01)
(Continued)

(52) U.S. Cl.
CPC ............ *G02B 21/362* (2013.01); *G01N 1/38* (2013.01); *G01N 1/40* (2013.01); *G01N 15/1434* (2013.01);
(Continued)

(58) Field of Classification Search
CPC ...... G02B 21/362; G02B 21/26; G02B 21/34; G02B 21/0008; G01N 1/38; G01N 1/40;
(Continued)

(56) References Cited

U.S. PATENT DOCUMENTS 6,426,213 B1 7/2002 Eisenson
7,438,486 B2 10/2008 Ho
(Continued)

OTHER PUBLICATIONS

Ombelet et al., "Infertility and the provision of infertility medical services in developing countries," Human Reproduction Update, vol. 14, No. 6, Sep. 26, 2008; pp. 605-621.
(Continued)

*Primary Examiner* — Jamie J Atala
*Assistant Examiner* — Mahmoud Kamal Abouzahra
(74) *Attorney, Agent, or Firm* — STERNE, KESSLER, GOLDSTEIN & FOX P.L.L.C.

(57) ABSTRACT

Embodiments disclosed herein relate to systems and methods for imaging a microscopic sample, for example in a liquid or a solid. The systems can be coupled to a portable electronic device and adjusted in three dimensions to allow for alignment of a lens assembly with an optical axis of a camera on a portable electronic device. This can allow for use across various-sized electronic devices, such as smartphones, tablets, and digital cameras. The systems can have a compact size, which allows for portable and/or at-home analysis of samples. The systems can be used to analyze sperm samples to detect fertility issues. The systems can be used to analyze soil or liquid samples to detect contaminants, such as microplastics.

30 Claims, 14 Drawing Sheets

(51) Int. Cl.

| | |
|---|---|
| ***G01N 1/40*** | (2006.01) |
| ***G01N 15/1434*** | (2024.01) |
| ***G02B 21/26*** | (2006.01) |
| ***G02B 21/34*** | (2006.01) |
| ***H04N 23/55*** | (2023.01) |
| ***H04N 23/56*** | (2023.01) |
| *G01N 15/01* | (2024.01) |
| *G01N 15/10* | (2006.01) |

(52) U.S. Cl.

CPC ............. *G02B 21/26* (2013.01); *G02B 21/34* (2013.01); *H04N 23/55* (2023.01); *H04N 23/56* (2023.01); *G01N 2001/386* (2013.01); *G01N 2001/4088* (2013.01); *G01N 2015/012* (2024.01); *G01N 2015/1006* (2013.01)

(58) Field of Classification Search

CPC ......... G01N 15/1434; G01N 2001/386; G01N 2001/4088; G01N 2015/012; G01N 2015/1006; H04N 23/55; H04N 23/56

USPC ............................................................ 348/79

See application file for complete search history.

(56) References Cited

U.S. PATENT DOCUMENTS

| | | | |
|---|---|---|---|
| 8,390,681 | B1 | 3/2013 | Burkman et al. |
| 9,057,702 | B2 | 6/2015 | Ozcan et al. |
| 9,310,300 | B2 | 4/2016 | Alt et al. |
| 9,661,200 | B2 | 5/2017 | O'Neill et al. |
| 9,961,243 | B2 | 5/2018 | Oliveira |
| 10,409,050 | B2 | 9/2019 | Kaminaga |
| 10,495,863 | B2 | 12/2019 | Lin et al. |
| 10,498,936 | B2 | 12/2019 | Ehrenkranz |
| 10,502,689 | B2 | 12/2019 | Beule et al. |
| 10,859,488 | B2 * | 12/2020 | Ben Shoshan ......... C12M 21/06 |
| 2002/0028471 | A1 * | 3/2002 | Oberhardt .......... G01N 15/1433 382/133 |
| 2005/0237605 | A1 * | 10/2005 | Vodyanoy .............. G02B 21/10 359/368 |
| 2007/0280677 | A1 | 12/2007 | Drake et al. |
| 2007/0298454 | A1 | 12/2007 | Green et al. |
| 2009/0181729 | A1 | 7/2009 | Griffin, Jr. et al. |
| 2009/0238423 | A1 | 9/2009 | Rigler |
| 2013/0100272 | A1 * | 4/2013 | Price .................... G02B 21/365 348/E5.045 |
| 2014/0072189 | A1 | 3/2014 | Jena et al. |
| 2014/0212959 | A1 | 7/2014 | Matsuura et al. |
| 2014/0243685 | A1 | 8/2014 | Patwardhan et al. |
| 2014/0254004 | A1 | 9/2014 | Wooder et al. |
| 2015/0002950 | A1 | 1/2015 | O'Neill et al. |
| 2015/0304555 | A1 * | 10/2015 | Ehrenkranz ............ H04N 23/56 348/370 |
| 2016/0004057 | A1 * | 1/2016 | Lin .................... G02B 21/0008 359/386 |
| 2016/0097769 | A1 * | 4/2016 | Martin ................... G01N 33/50 427/2.12 |
| 2016/0147057 | A1 | 5/2016 | Nagayama et al. |
| 2017/0330321 | A1 | 11/2017 | Hsu et al. |
| 2018/0192030 | A1 * | 7/2018 | Greenberg ........... H04N 13/254 |
| 2018/0307029 | A1 * | 10/2018 | Fellin ..................... G02B 21/02 |
| 2018/0348207 | A1 | 12/2018 | Nosrati et al. |
| 2018/0368815 | A1 | 12/2018 | Kim |
| 2019/0293545 | A1 | 9/2019 | Ben Shoshan et al. |
| 2020/0073109 | A1 * | 3/2020 | Futami ................... H04N 23/45 |
| 2020/0103347 | A1 * | 4/2020 | Okada .................... G02B 21/24 |
| 2020/0257099 | A1 * | 8/2020 | Takahashi ............ G02B 21/367 |
| 2020/0282402 | A1 | 9/2020 | Andersen et al. |

OTHER PUBLICATIONS

Yániz et al., "Expanding the Limits of Computer-Assisted Sperm Analysis through the Development of Open Software," Biology, vol. 9, No. 207, Aug. 5, 2020; pp. 1-16.

Yu et al., "Emerging Technologies for Home-based Semen Analysis," Andrology, vol. 6, No. 1, Jan. 2018; pp. 1-20.

* cited by examiner

SYSTEMS AND METHODS FOR IMAGING AND ANALYZING A MICROSCOPIC SAMPLE

CROSS-REFERENCE

This application claims the benefit of U.S. Provisional Application No. 63/293,142, filed Dec. 23, 2021, which is incorporated here in its entirety by reference thereto.

BACKGROUND

Field

The present disclosure relates to systems and methods for detecting and analyzing a microscopic sample. More specifically, the present disclosure relates to an optical system that can be attached to an electronic device to image, detect, and analyze a microscopic sample (e.g., microplastics in a liquid, microorganisms in soil, or sperm health in a semen sample).

BRIEF SUMMARY

Some embodiments are directed to an apparatus for analyzing a sample that includes a support structure and a microscope assembly. In some embodiments, the support structure includes a first side having a length extending along a first axis in a first direction, a second side extending along a second axis in a second direction that is perpendicular to the first direction, and a third side parallel to the second side. In some embodiments, the microscope assembly is coupled to the support structure. In some embodiments, the microscope assembly includes a housing; a lens, an illuminator, and a collimator disposed within the housing; an opening defined in the housing that is configured to receive at least a portion of a microscope slide. In some embodiments, the microscope slide is configured to receive the sample. In some embodiments, the microscope assembly is movable between a first position and a second position along the support structure. In some embodiments, the apparatus is configured to couple to a portable electronic device that has a camera. In some embodiments, the microscope assembly is configured to magnify the sample.

In some embodiments, the microscope assembly is configured to magnify the sample up to 400×.

In some embodiments, the microscope assembly is configured to magnify the sample such that the camera of the portable electronic device can capture an image of the sample, wherein the sample comprises a structure having an effective diameter less than about 100 μm.

In some embodiments, the microscope assembly is movable to a third position between the first position and the second position, wherein the third position aligns with an optical axis of the camera.

In some embodiments, the housing is configured to move in the direction of the optical axis from a third position to a fourth position.

In some embodiments, the apparatus further includes a motor configured to move the microscope assembly along the support structure.

In some embodiments, the illuminator is oriented along an optical axis such that light is directed along the optical axis.

In some embodiments, the collimator is oriented along the optical axis and disposed between the first side of the support structure and the illuminator.

In some embodiments, the apparatus further includes a polarizer disposed between the collimator and the first side of the support structure.

In some embodiments, the apparatus further includes a second polarizer and an emission filter.

In some embodiments, the apparatus further includes an LED light. In some embodiments, the LED light surrounds at least a portion of the lens.

In some embodiments, the illuminator is oriented along a third axis that is parallel to the first axis and perpendicular to the optical axis, and wherein the collimator is oriented perpendicular to the optical axis.

In some embodiments, the apparatus further includes a mirror oriented at an angle relative to the third axis and to the optical axis.

In some embodiments, the apparatus further includes an insulating material disposed within the housing.

In some embodiments, the third side is movable along the first side between a first position and a second position, wherein the distance between second side and the third side is larger in the first position than in the second position.

In some embodiments, the second side and the third side are configured to couple to the portable electronic device by releasably clamping to the portable electronic device.

In some embodiments, the microscope slide is a microfluidic slide comprises at least one well, an inlet, and an outlet.

In some embodiments, the microscope slide is a haemocytometer.

Some embodiments are directed to a method for analyzing a sample. In some embodiments, the method includes arranging a microscope assembly on an electronic device, and the microscope assembly is coupled to a support structure comprising a first side having a length extending along a first axis and a height extending along a second axis that is perpendicular to the first axis. In some embodiments, the arranging comprises moving the microscope assembly in the direction of the first axis and moving the microscope assembly in the direction of the second axis such that an optical axis of a camera of the electronic device passes through a lens of the microscope assembly, wherein the optical axis is perpendicular to the first axis and the second axis. In some embodiments, the method includes inserting a microscope slide containing the sample into the microscope assembly, wherein the sample is a microscopic sample having a dimension less than about 100 μm. In some embodiments, the method includes adjusting the microscope assembly along the optical axis. In some embodiments, the method includes providing, by an illuminator, light to the sample such that the lens magnifies the sample at least 40×. In some embodiments, the method includes capturing, by the camera, an image of the magnified sample. In some embodiments, the method includes analyzing the magnified sample.

In some embodiments, the method includes processing a raw sample to obtain the sample. In some embodiments, the processing includes adding a liquid to the raw sample to create a mixture; filtering the mixture using a filter to create a filtered mixture; and separating components of the filtered mixture by density to separate a supernatant comprising the sample from other components of the filtered mixture.

In some embodiments, the separating step comprises adding a salt to the filtered mixture, and wherein the filter has a pore size of 5 μm.

In some embodiments, the processing includes applying a positive pressure to the filtered mixture to separate the filtered mixture from the filter; adding a dye to the supernatant; concentrating the supernatant; and transferring a portion of the supernatant to the microscope slide.

In some embodiments, the liquid comprises hydrogen peroxide, a Fenton's reagent, or combinations thereof, and the filter has a pore size of 5 μm.

DETAILED DESCRIPTION

Figure 1A:
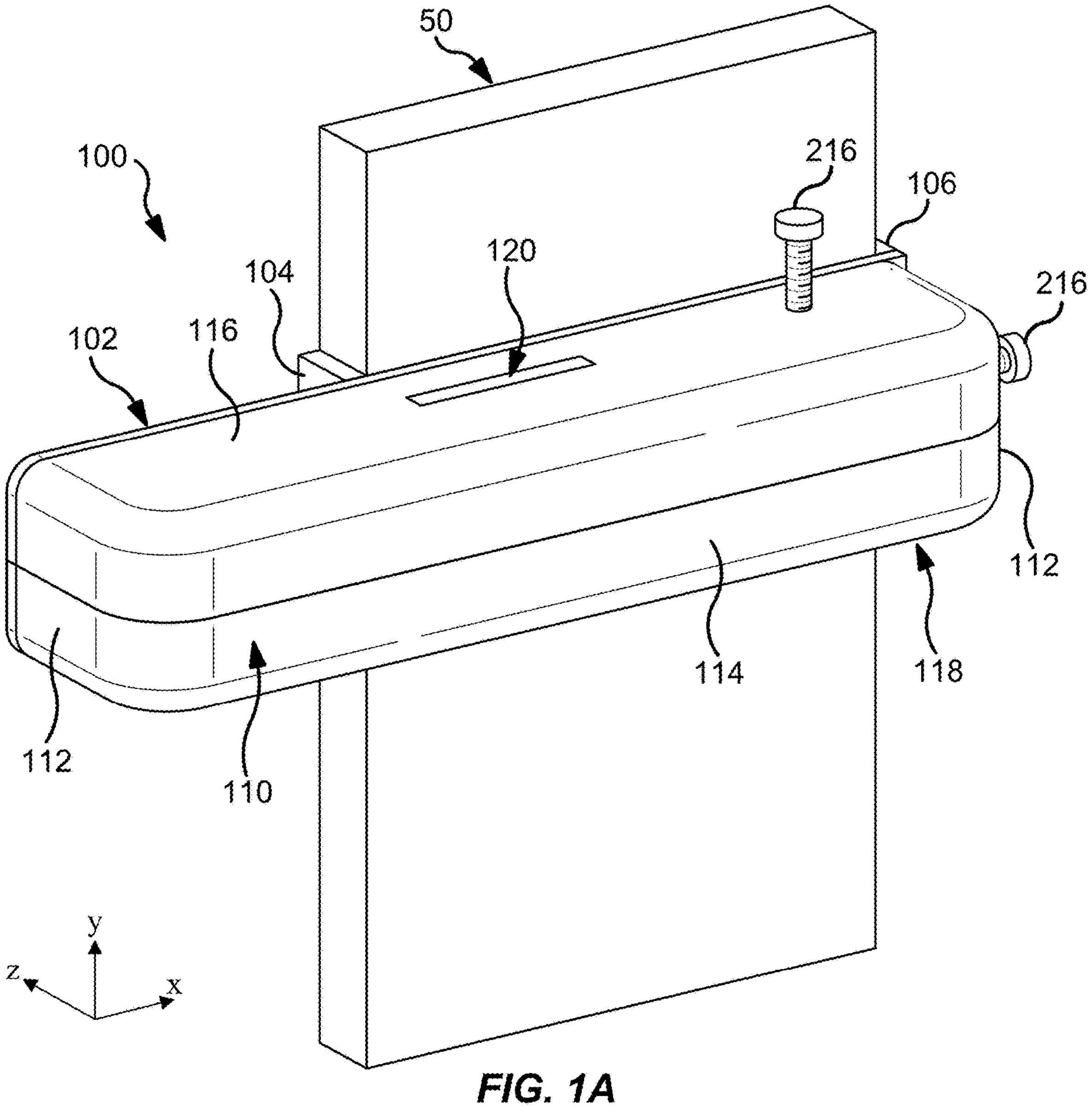
FIG. 1A shows a device according to some embodiments.

Systems for analysis of microscopic samples can be used for various applications, such as detection of water quality analysis (e.g., detecting microplastics), soil analysis, and various healthcare applications, for example sperm analysis. Existing systems can use laboratories to analyze samples. In some cases, the laboratories are remote from the collection site, which can increase time and cost related to analysis, and increase the risk that a sample could be compromised during transportation. Such laboratories use laboratory microscopes, which can be expensive, require numerous components and standardization, and typically are not mobile. For example, existing pathology laboratory equipment uses time-consuming procedures, including fixation, paraffin embedment, sectioning, and staining to prepare microscope slides. Existing testing systems are often geographically and economically inaccessible and labor intensive. Accordingly, these procedures are not possible in a mobile setting.

Although some devices can analyze samples outside of a laboratory, such devices have significant limitations. For example, these devices are typically not compatible with numerous other devices, lack the ability to adjust the lens, and cannot be used to quantify movement of samples during detection.

Embodiments described herein overcome these and other challenges by providing—among other benefits—a low-cost, compact, lightweight microscope system that can be universally compatible with an electronic device (e.g., a smartphone, a tablet, etc.), provide both coarse adjustment of the device and fine adjustment of the lens in three dimensions, improve contrast, and accurately image a densely populated microscopic sample, in which particles often collide and overlap. Embodiments described herein can be used for testing various types of samples. For example, embodiments described herein can image and analyze a sperm sample to analyze male fertility and image and analyze liquid or soil samples to detect microplastics and microorganisms.

Preliminary work demonstrated that it was possible to couple external optics to a smartphone and achieve high-magnification imaging. In certain embodiments, the system can be optimized for image quality and integrated into a single small-form housing unit that can attach to any phone. The first task in imaging optimization will be to perform a technical analysis of key dimensions of the illumination and camera systems of target smartphones that the system will be designed for, including the positions of the flashlight and camera, and the intrinsic parameters of the camera, including sensor size and format, lens focal length, lens F/#.

In some embodiments, the biological sample can be a liquid containing particles that can move and change shape, size, position, overlap, and depth/focus. Additionally, some biological samples can be nearly invisible due to low absorption or low contrast due to refractive index. In contrast to laboratory microscopes, which are expensive, large, include more components, can often autofocus, and require additional standardization and structural stability, devices disclosed herein can achieve similar results as laboratory microscopes but in a compact, portable design. In some embodiments, device 100 can overcome these challenges by coupling to an electronic device (e.g., electronic device 50) and can work in various conditions with variations in lighting, field of view, and optical limitations. In some embodiments, device 100 can be used to effectively image a sample despite optical aberrations, illumination artifacts, and error/tolerance in lens manufacturing. This approach results in a high level of accuracy because it provides enough resolution to enable an analysis of individual particles. This level of detail makes the results more accurate and allows new types of analyses to be performed, such as counting sperm that are moving in a specific direction.

Device

In some embodiments, device 100, discussed in more detail below, can include a magnification system, an illumination system, and a sample-holder system. In some embodiments, these systems can be at least partially in the same axis as the camera of an electronic device (e.g., electronic device 50). In some embodiments, these systems can also be adjustably coupled to a portable electronic device that has any length, width, or height. In some embodiments, device 100 can be used for simultaneous microscopy by multiple cameras on the same phone (e.g., cameras in parallel axes). In some embodiments, components of device 100 can be modular and interchangeable. In some embodiments, device 100 can be portable. In some embodiments, device 100 has a total volume of less than or equal to 16 $in^3$. For example, in some embodiments, device 100 has a volume from greater than or equal to 2 $in^3$ to less than or equal to 16 $in^3$, from greater than or equal to 5 $in^3$ to less than or equal to 14 $in^3$, from greater than or equal to 8 $in^3$ to less than or equal to 12 $in^3$. In some embodiments, device 100 has a geometry such that device 100 does not block other components of electronic device 50, such as speaker, screen, buttons, etc.

Embodiments disclosed herein relate to a device (e.g., device 100) that can be used to image and analyze microscopic samples. In some embodiments, the microscopic sample can be a structure or region of interest that include particles that have a size defined by an effective diameter of the particles. As used herein, the term "effective diameter" is utilized to describe the size of a particle, but this term should not be interpreted as requiring a particle to have a circular diameter or shape. Instead, particles may have non-circular shapes, and in such embodiments, the term "effective diameter" is intended to refer to the maximum cross-sectional dimension of the shape. For example, the "effective diameter" of a particle having an elliptical cross-sectional shape would be the length of the major axis of the elliptical shape. For example, the "effective diameter" of a particle having an irregular shape would be the longest cross-sectional dimension of the particle. In some embodiments, the microscopic sample includes particles having an effective diameter greater than or equal to 5 μm and less than or equal to about 100 μm. In some embodiments, the effective diameter can be from greater than or equal to about 5 μm to less than or equal to about 100 μm, from greater than or equal to about 20 μm to less than or equal to about 80 μm, from greater than or equal to about 50 μm to less than or equal to about 60 μm, or within a range having any two of these values as endpoints.

In some embodiments, device 100 can be compatible with an electronic device (e.g., electronic device 50). In some embodiments, electronic device 50 includes a camera, such as a digital camera. In some embodiments, electronic device 50 is a smartphone, tablet, or digital camera. In some embodiments, electronic device 50 is a smartphone.

As shown in FIG. 1A, device 100 can include housing 110 and walls 102, 104, and 106. In some embodiments, device 100 can couple to an electronic device (e.g., electronic device 50). For example, device 100 can couple to electronic device 50 using a clip structure, clamp structure, adhesives, magnets, elastic holder, or combinations thereof. In some embodiments, device 100 can couple to electronic device 50 using one or more of walls 102, 104, or 106. In some embodiments, device 100 includes a magnet disposed on wall 102, and the magnet can engage with a magnet located on electronic device 50. In some embodiments, device 100 does not include walls 104 and 106, and electronic device 50 couples to device 100 at wall 102.

In some embodiments, the device 100 can be configured for coarse adjustment of various components in which one or more walls of device 100 can be adjusted to accommodate electronic devices having various sizes. In some embodiments, as illustrated in FIGS. 1A to 4, device 100 can include walls 102, 104, and 106. Walls 104 can create a clamp structure that couples electronic device 50 to device 100. For example, one or more of walls 104 and 106 can be movable along wall 102 to accommodate different sized electronic devices (e.g., electronic device 50). In some embodiments, wall 104 is movable relative to wall 106 such that a space between wall 104 and wall 106 can change. For example, in some embodiments, wall 104 is movable between a first position (e.g., shown in FIG. 2A) to a second position (e.g., shown in FIG. 2B). In some embodiments, walls 104 and 106 do not move relative to each other, and wall 102 moves in a direction perpendicular to the optical axis (e.g., optical axis 1).

Figure 2A:
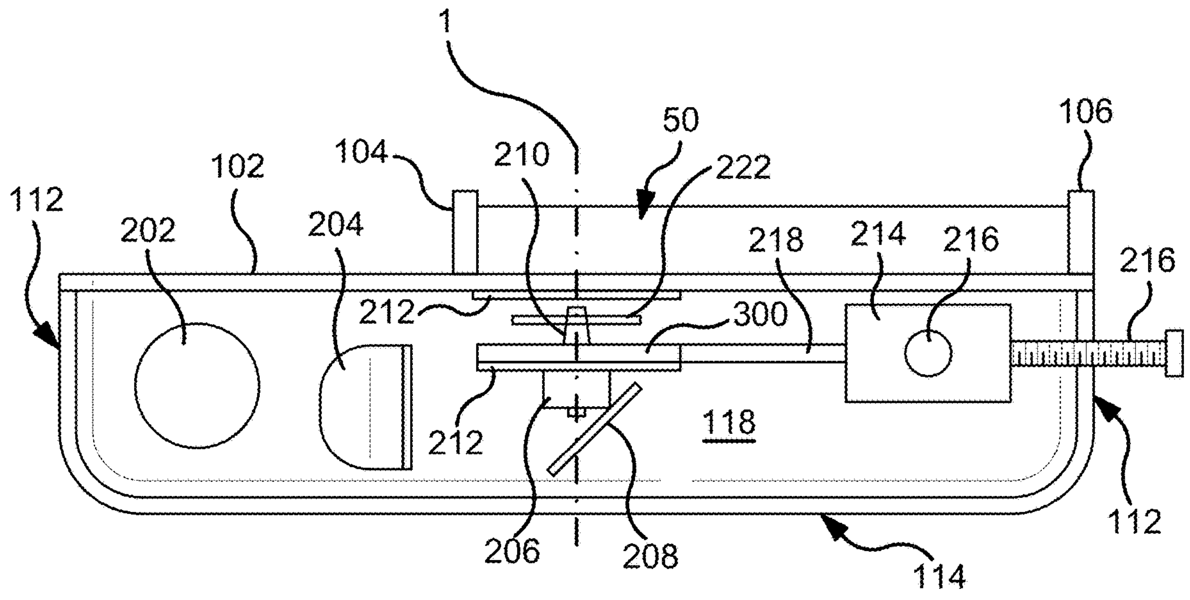
FIG. 2A shows a top-down view of the device shown in FIG. 1B according to some embodiments.
Figure 2B:
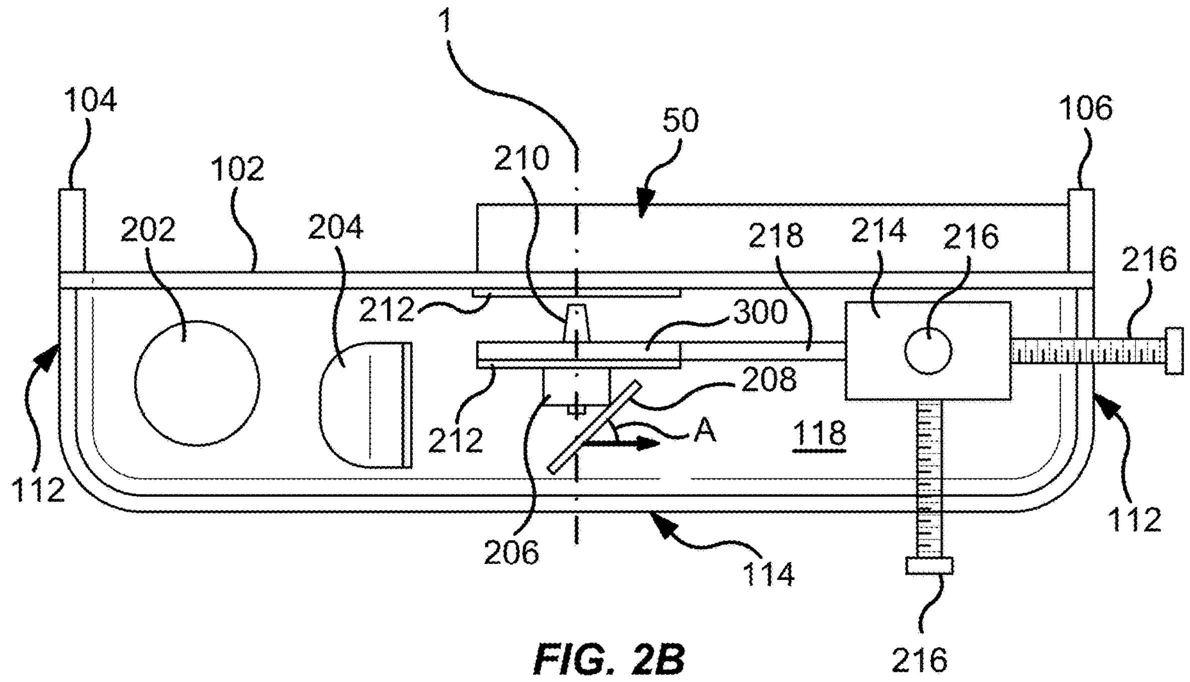
FIG. 2B shows a top-down view of the device shown in FIG. 1B according to some embodiments.

In some embodiments, in the first position, as shown in FIG. 2A, electronic device 50 is in contact with both wall 104 and wall 106, and each of wall 104 and wall 106 apply a pressure to the electronic device 50 to couple electronic device 50 to device 100. In some embodiments, as shown in FIG. 2B, wall 104 can be moved from the first position to the second position to release electronic device 50. In some embodiments, wall 104 can be positioned at any point along wall 102 to accommodate electronic devices of various sizes. Although movement is discussed related to wall 104, it is to be understood that wall 106 can move as described above relative to wall 104. In some embodiments, wall 104 is movable along wall 102 and wall 106 is not movable along wall 102. In some embodiments, wall 106 is movable along wall 102 and wall 104 is not movable along wall 102. In some embodiments, both wall 104 and wall 106 are movable along wall 102.

Figure 1B:
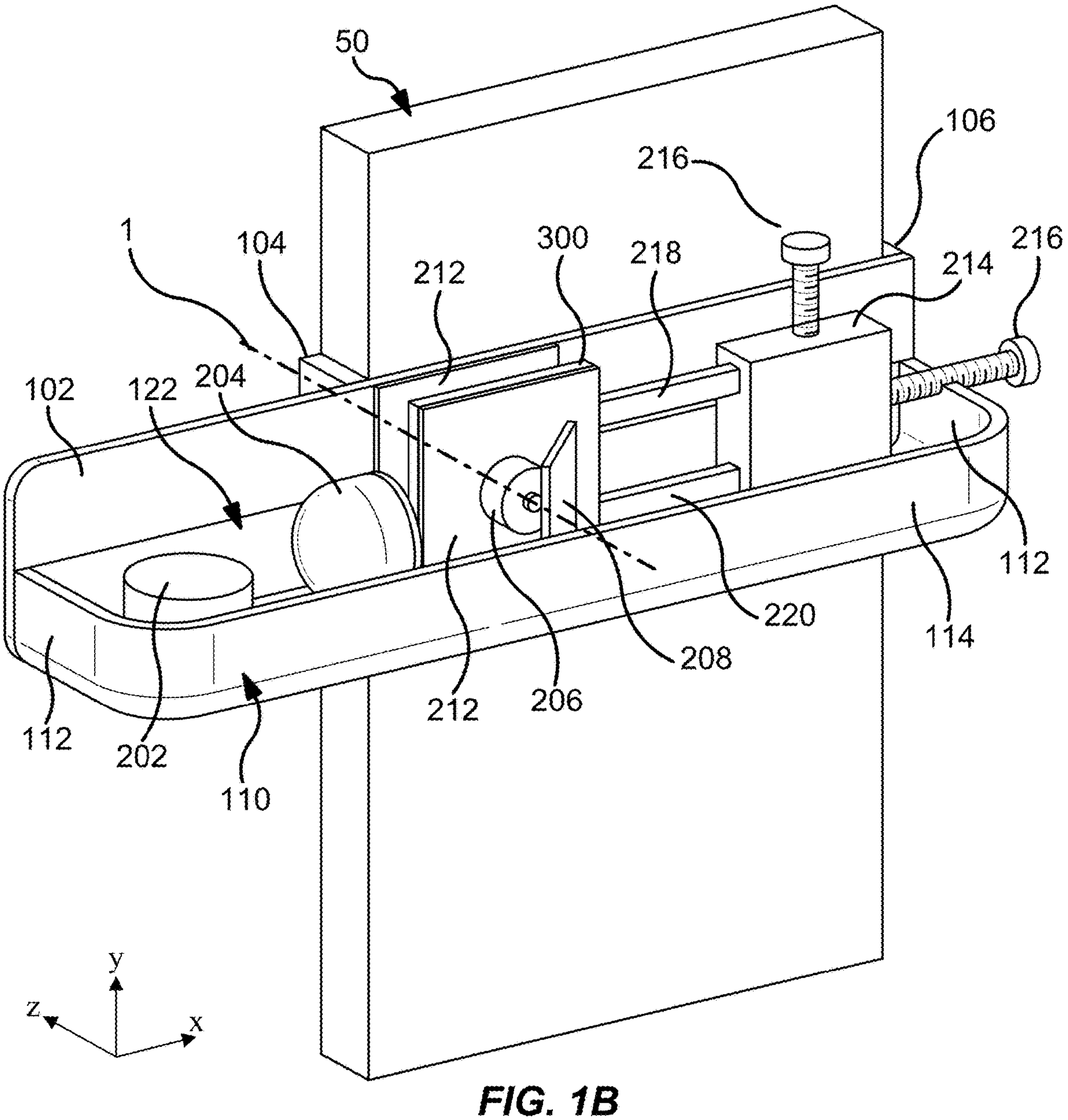
FIG. 1B shows the device of FIG. 1A with at least a portion of the housing removed.

As shown in FIG. 1A, in some embodiments, device 100 can include housing 110 that contains components of a microscope assembly, discussed in more detail below. FIG. 1B illustrates device 100 with wall 116 of housing 110 removed. Housing 110 can be defined by walls that enclose the components of the microscope assembly. For example, in some embodiments, housing 110 is defined by walls 102, 110, 112, 114, 116, and 118. In some embodiments, one or more of the walls defining housing 110 are removable. In some embodiments, housing 110 is movable in the direction of optical axis 1 such that housing 110 is closer to or farther from a camera of electronic device 50. In some embodiments, device 100 can be telescopically extendable. For example, in some embodiments, one or more walls can telescope to accommodate different sized electronic devices. For example, In some embodiments, one or more of walls 102, 104, and 106 can telescope in the X, Y, and/or Z directions. In some embodiments, housing 110 is movable to allow for lens assembly 210 to be moved closer to or farther from a camera of electronic device 50.

Device 100 can include lens assembly 210. In some embodiments, device 100 can be adjusted such that lens assembly 210 aligns with optical axis 1 of a camera of electronic device 50 by translation housing 110 in the axis perpendicular to optical axis 1. For example, lens assembly 210 is considered to align with optical axis 1 when optical axis 1 passes through lens assembly 210. In some embodiments, device 100 can be adjusted by one- or multi-directional gear and rack, traveling nut, ball or roller screw, chain or belt drives, rack and pinion actuators, and detent, friction, or leaf spring slides. In some embodiments, alignment is manual, for example using screws 216. In some embodiments, alignment can be guided by software which detects field of view boundaries. For example, in some embodiments, device 100, housing 110, or slide 300 can be electrically or manually moveable in the perpendicular plane and movable (e.g., focusable) along optical axis 1.

In some embodiments, lens assembly 210 or housing 110, or components thereof, can be adjusted in three dimensions. For example, these components can be adjusted in the X, Y, and/or Z direction. In some embodiments, optical axis 1 defines a Z-axis in an X-Y-Z coordinate system. In some embodiments, the housing 110 moves in the X, Y, and/or Z directions. In some embodiments, lens assembly 210 moves in the X, Y, and/or Z directions. In some embodiments, housing 110 and lens assembly 210 can each move independently of the other in the X, Y, and/or Z directions. In some embodiments, when slide 300 is disposed in device 100, slide 300 can be moved in the X, Y, and/or Z direction. In some embodiments, slide 300 can be moved in the X, Y, and/or Z direction independently of housing 110 and lens assembly 210. In some embodiments, device 100 can include a motor that can move one or more components in the X, Y, and/or Z direction. In some embodiments, device 100 includes a motor configured to move housing 110 relative to wall 102. In some embodiments, device 100 includes a motor configured to move lens assembly 210.

In some embodiments, such movement of device 100 and its components allows for fine position adjustment to control focal length, field of view, depth of field, working distance, etc. In some embodiments, device 100 includes various lighting schemes discussed herein that allow for versatility and high-quality imaging. In some embodiments, device 100 can be used with various portable electronic devices, such as phones, tablets, digital cameras, and the like. In some embodiments, device 100 is adjustable to accommodate portable electronic devices with various sizes (e.g., length, height, or width). In some embodiments, device 100 can be moved coarsely in 3 dimensions. In some embodiments, device 100 includes a cover that can be used to cover a flashlight (e.g., from electronic device 50) that is any distance and angle from the camera. In some embodiments, the cover can be moved in the X, Y, and/or Z direction independently of lens assembly 210.

Device 100 can include a slot 120 for receiving a slide (e.g., slide 300). In some embodiments, device 100 is compatible with various types of slides, such as microscope slides and microfluidic slides. These are discussed in more detail below. As shown in FIG. 1A, slot 120 can be disposed in wall 116. As discussed in more detail below, slot 120 can be positioned such that when a slide (e.g., slide 300) is inserted, the slide aligns with a microscope assembly disposed within housing 110. In some embodiments, slot 120 is positioned such that an optical axis (e.g., optical axis 1) passes through a slide (e.g., slide 300) when the slide is inserted into slot 120.

As shown in FIGS. 1B to 3, device 100 can include a microscope assembly disposed within housing 110. In some embodiments, the microscope assembly power source 202, illuminator 204, collimator 206, mirror 208, and lens assembly 210. In some embodiments, power source 202 is a battery. In some embodiments, power source 202 is a rechargeable battery. In some embodiments, power source 202 is a replaceable battery. In some embodiments, illuminator 204 includes a light source that provides light to collimator 206.

In some embodiments, illuminator 204 is offset from optical axis 1 and oriented at an angle relative to optical axis 1. In some embodiments, illuminator 204 can be oriented greater than 0 degrees to less than or equal to 90 degrees relative to optical axis 1. For example, as shown in FIGS. 2A and 2B, illuminator 204 can be oriented 90 degrees relative to optical axis 1. In some embodiments, mirror 208 is oriented at an angle A relative to optical axis 1 and positioned such that optical axis 1 passes through mirror 208. For example, as illustrated in FIGS. 2A and 2B, illuminator 204 is oriented 90 degrees relative to optical axis 1, and mirror 208 is oriented 45 degrees relative to optical axis 1 such that light from illuminator 204 is redirected to collimator 206. In some embodiments, mirror 208 can be rotated between a first angle relative to optical axis 1 to a second angle relative to optical axis 1 to adjust the direction of light from illuminator 204. In some embodiments, first angle is from about 10 degrees to about 30 degrees relative to optical axis 1. In some embodiments, second angle is from about 60 degrees to about 80 degrees relative to optical axis 1. In some embodiments, mirror 208 can rotate from about 30 degrees relative to optical axis 1 to about 60 degrees relative to optical axis 1.

In some embodiments, lens assembly 210 includes an objective lens. In some embodiments, lens assembly 210 includes multiple lenses. In some embodiments, lens assembly 210 includes a single lens. In some embodiments, lens assembly 210 can include multiple lenses that act as one lens, which can help to reduce optical aberrations. In some embodiments, lens assembly 210 includes 1 or more (e.g., 2 or more, 3 or more, or 4 or more) lenses. In some embodiments, as illustrated in FIGS. 2A and 2B, lens assembly 210 and collimator 206 are positioned such that optical axis 1 passes through both lens assembly 210 and collimator 206. In some embodiments, collimator 206 can be oriented perpendicular to optical axis 1. In some embodiments, device 100 can include a darkfield stop proximate to collimator 206 that can block the center of the light beam. In some embodiments, darkfield stop can move between a first position in which light travels through the collimator and the darkfield stop and a second position in which light travels through the collimator but not the darkfield stop. In some embodiments, the darkfield stop converts the illumination from traditional (brightfield) to darkfield (or a variant, such as Rheinberg) illumination.

In some embodiments, lens assembly 210 is aligned along optical axis 1 such that optical axis 1 passes through lens assembly. In some embodiments, optical axis 1 is an axis that passes through a camera lens of electronic device 50.

Figure 3:
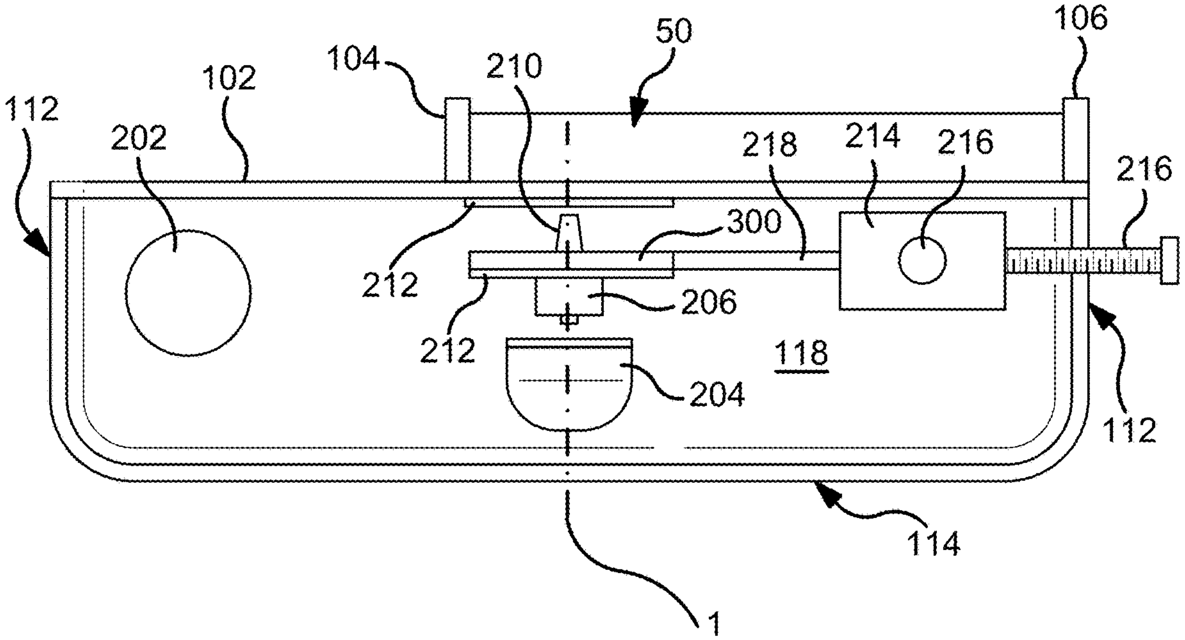
FIG. 3 shows a device according to some embodiments.

FIG. 3 illustrates device 100 according to some embodiments. As illustrated in FIG. 3, illuminator 204 can be positioned such that optical axis 1 passes through illuminator 204. For example, in some embodiments, optical axis 1 passes through illuminator 204, collimator 206, and lens assembly 210. In some embodiments, device 100 does not include mirror 208.

Figure 4:
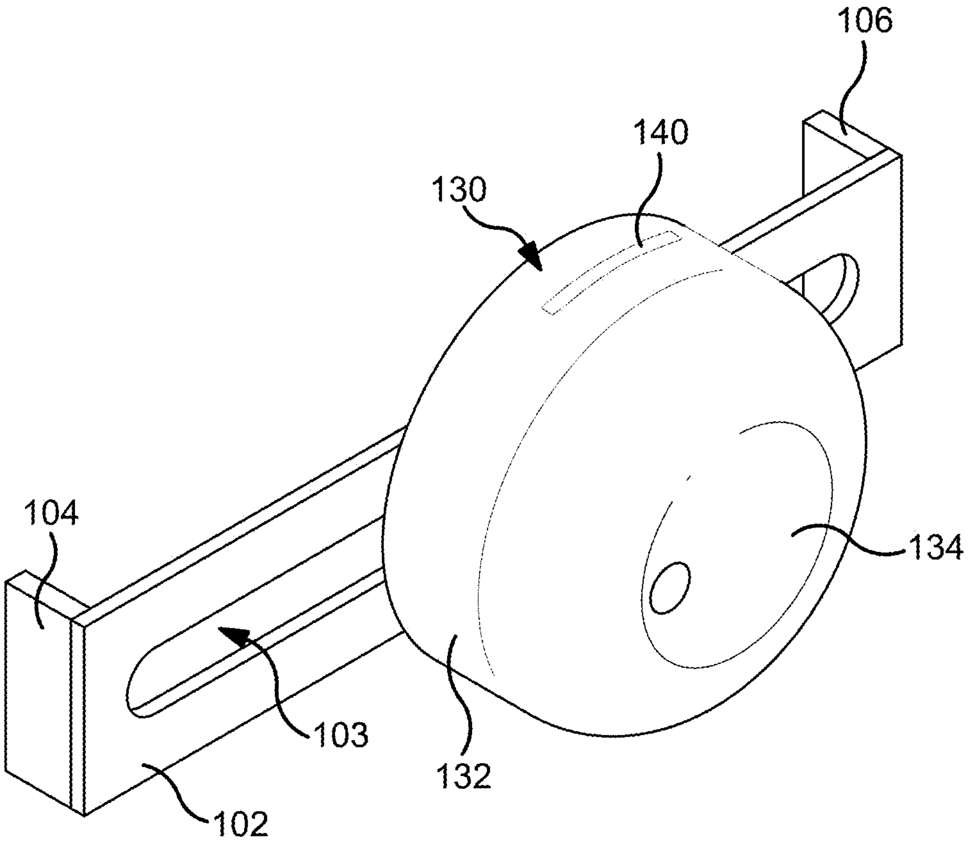
FIG. 4 shows a device according to some embodiments.

FIG. 4 illustrates device 100 according to some embodiments. As shown in FIG. 4, device 100 can include housing 130 that has round shape. In some embodiments, housing 130 includes by walls 132 and 134. In some embodiments, housing 130 includes the same components as housing 110 discussed above related to FIGS. 1A-3. For example, In some embodiments, housing 130 contains power source 202, illuminator 204, collimator 206, and lens assembly 210. In some embodiments, housing 130 can include a slot 120 for receiving slide 300. Although not shown, it is to be understood that housing 130 can be adjust in a similar matter as housing 110, for example, using screws 216.

In some embodiments, as shown in FIG. 4, wall 102 can include opening 103 defined in wall 102. In some embodiments, the housing (e.g., housing 110 or housing 130) can couple to wall 102 through opening 103. For example, the housing can include a component that extends through opening 103 such that the housing can slide within opening 103 to adjust the position of the housing along wall 103. Although housing 130 is illustrated in FIG. 4, it is to be understood that housing 110 could be used with the configuration shown in FIG. 4.

In some embodiments, as illustrated in FIGS. 1B-3, device 100 can include adjusting member 214 that adjusts components of device 100 in the X and Y directions. In some embodiments, adjusting member 214 includes screws 216 that can be turned to move housing 110, lens assembly 210, and/or slide 300. In some embodiments, adjusting member 214 includes screws 216 in the X, Y, and Z directions, as shown in FIG. 2B. In some embodiments, adjusting member 214 is a flexure.

Figure 5:
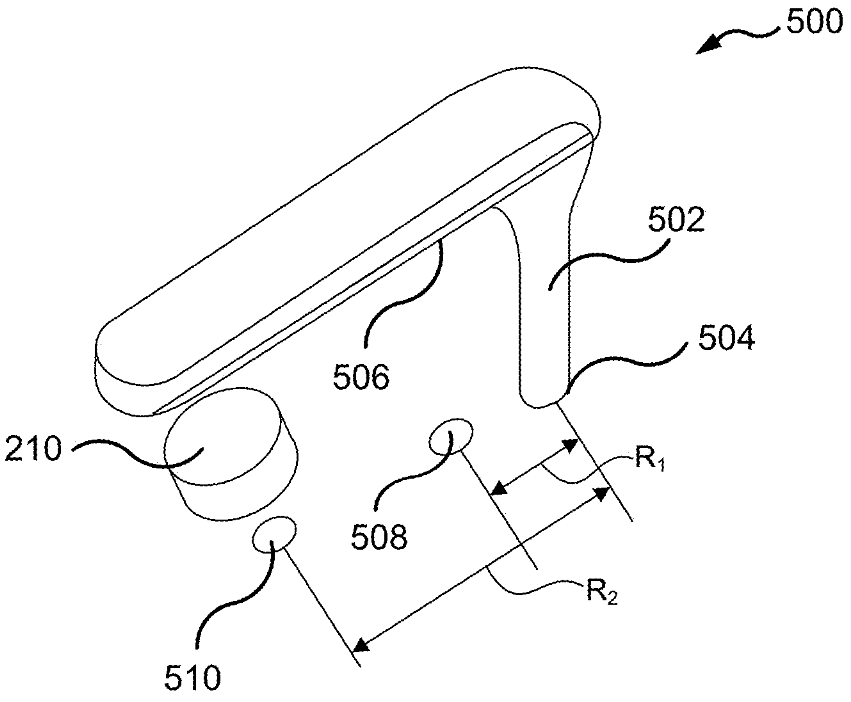
FIG. 5 shows a light guide according to some embodiments.
Figure 6:
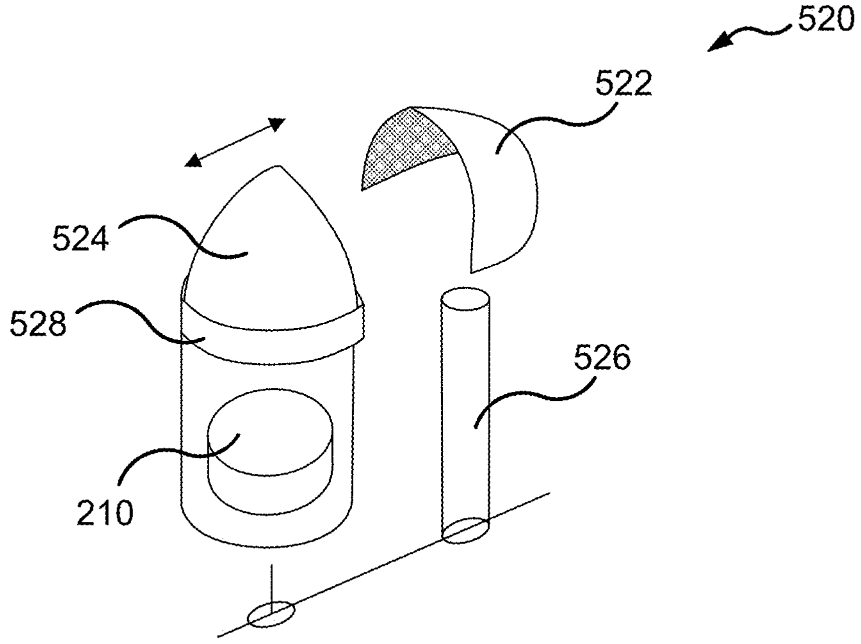
FIG. 6 shows a light guide according to some embodiments.

In some embodiments, device 100 includes a light guide, for example as shown in FIGS. 5 and 6. In some embodiments, the light guide 204 includes a solid, two-piece construction with a clear portion to spread light uniformly over an output surface and a diffuse portion to improve uniformity. In some embodiments, illuminator 204 is a parabolic mirror with an air gap.

FIG. 5 illustrates light guide 500 according to some embodiments. In some embodiments, light guide 500 can be used in device 100. In some embodiments, light guide 500 can include pipe 502, light 504, and diffuser 506. In some embodiments, pipe 502 is a clear light pipe. FIG. 5 illustrates various positions of a camera of an electronic device (e.g., electronic device 50) used with device 100. For example, in some embodiments, camera can be located at or between positions 508 and 510. In some embodiments, the minimum distance between pipe 502 and a camera is equal to $R_1$ and the maximum distance between pipe 502 and a camera is equal to $R_2$.

FIG. 6 illustrates light guide 520 according to some embodiments. In some embodiments, light guide 520 can be used in device 100. In some embodiments, light guide 520 includes reflectors 522 and 524. In some embodiments, reflectors 522 and 524 are each parabolic reflectors. In some embodiments, reflectors 522 and 524 are each hollow parabolic reflectors. In some embodiments, illuminator 520 includes pipe 526. In some embodiments, pipe 526 is a clear light pipe. In some embodiments, illuminator 520 includes diffuser 528.

In some embodiments, slide 300 is a microfluidic slide that includes an inlet, an outlet, and one or more chambers. In some embodiments, slide 300 can be used in device 100. In some embodiments, slide 300 includes an inlet and an outlet into which a pipette or bulb syringe can be inserted. In some embodiments, slide 300 is washable and reusable. For example, in some embodiments, a pipette or bulb syringe can be inserted into the inlet and/or outlet to wash or reuse the chamber. In some embodiments, the chamber can include a check valve to prevent backflow. The slide 300 containing a microscopic sample can be attached in or onto the imaging device (e.g., device 100), which can be attached to a portable electronic device (e.g., electronic device 50). In some embodiments, slide 300 can be made using micromilling, injection molding or photolithography.

Figures 7A, 7B, 7C:
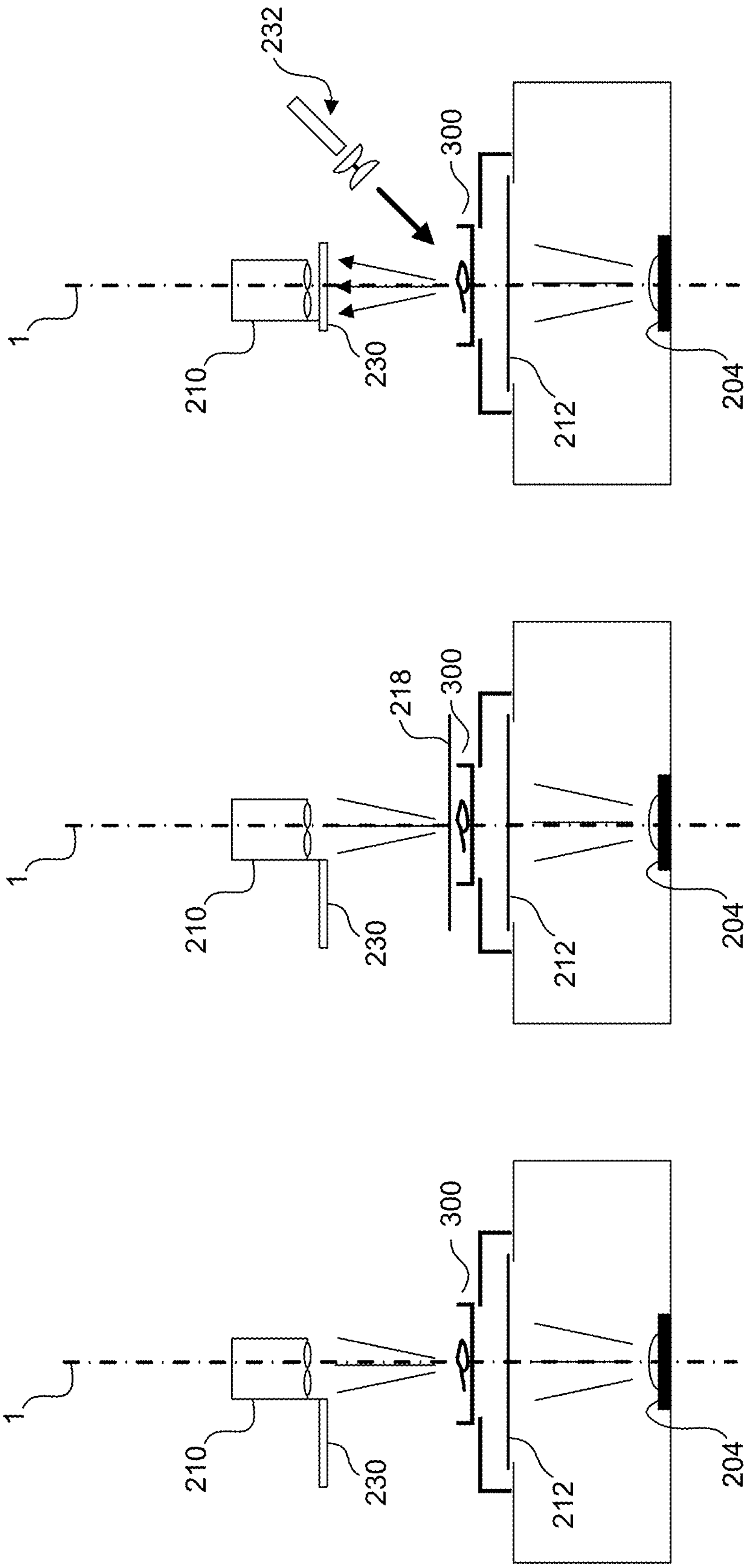
FIGS. 7A-7C show components of devices according to some embodiments.
Figure 8A:
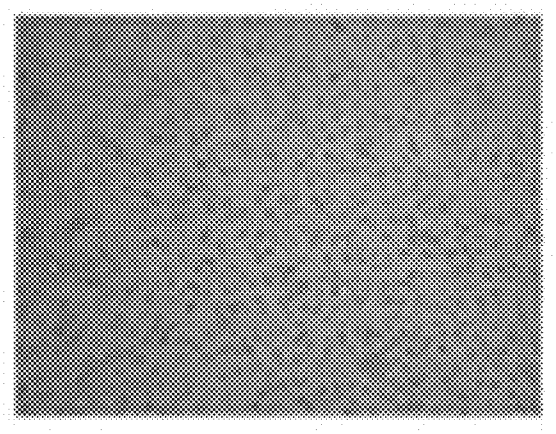
FIGS. 8A-8D show images captured by different devices.
Figure 8B:
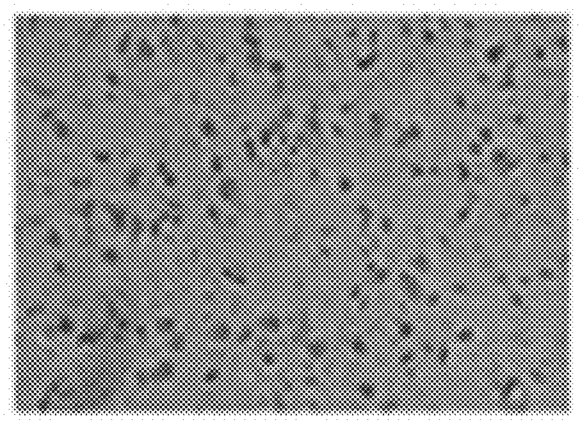
Figure 8C:
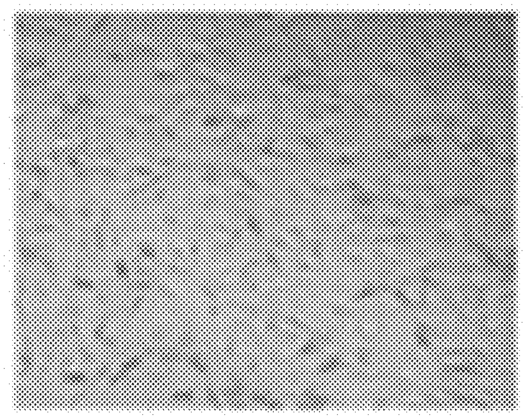
Figure 8D:
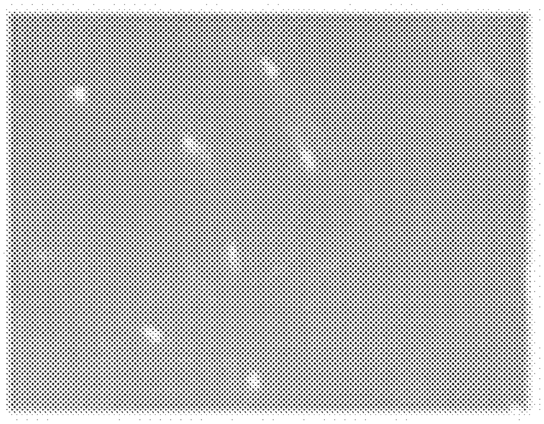

FIGS. 7A-7C illustrates systems according to some embodiments. As illustrated in FIGS. 7A-7C, device 100 can have one or more polarization filters (e.g., polarizer 212) and one or more analyzers (e.g., analyzer 218). As illustrated in FIG. 7A, device 100 can include a polarization filter (e.g., polarizer 212). In some embodiments, the polarizer filters out light. In some embodiments, analyzer 218 rotates light that was filtered by polarizer 212 a relative angle of between 0 degrees to 90 degrees. In some embodiments, device 100 includes 1 or more (e.g., 2 or more) polarizers 212. In some embodiments, device 100 does not include a polarization filter. In some embodiments, as shown in FIG. 7A, device 100 can include a polarizer 212 disposed between slide 300 and illuminator 204. In some embodiments, as illustrated in FIG. 7B, device 100 can include an analyzer 218. In some embodiments, analyzer 218 is a polarization filter as described above. In some embodiments, as illustrated in FIG. 7B, analyzer 218 can be between slide 300 and lens assembly 210. In some embodiments, polarizer 212 filters out lightwaves of a certain direction/"roll", and the filtered light passes through the sample (e.g., on slide 300) and is diffracted slightly to a new direction/roll, and the analyzer puts the diffracted light back in a direction relative to the incoming light where it can interfere with the original filtered light. This causes colors to appear at the locations where a sample caused the light to become diffracted. In some embodiments, device 100 can include one polarizer 212 disposed between slide 300 and illuminator 204. In some embodiments, device 100 can include one analyzer 218 disposed between slide 300 and lens assembly 210. In some embodiments, device 100 can include a polarizer 212 disposed between slide 300 and lens assembly 210 and a an analyzer 218 disposed between slide 300 and lens assembly 210.

In some embodiments, device 100 can include an emission filter (e.g., emission filter 230). In some embodiments, emission filter 230 is movable between a first position and a second position. In some embodiments, in the first position emission filter 230 is positioned such that the optical axis passes through emission filter 230, as illustrated in FIG. 7A. In some embodiments, in the second position emission filter 230 is positioned such that the optical axis does not pass through emission filter 230, as illustrated in FIGS. 7A and 7B. In some embodiments, as illustrated in FIGS. 7A to 7C, emission filter 230 can be slidably connected to lens assembly 210. In some embodiments, as illustrated in FIGS. 7A-7C, device 100 can include 1 or more polarizers 212 and emission filter 230.

In some embodiments, as illustrated in FIG. 7C, device 100 can include light source 232. In some embodiments, light source 232 is an LED light source 232 that emits LED light. In some embodiments, light source 232 is an excitation light (e.g., blue excitation light). In some embodiments, when a sample has been dyed, the excitation light makes the dyed sample glow. The emission filter removes all colors that are not glowing, thus making the glow more visible to the camera.

In some embodiments, when light source 232 is used illuminator 204 is not used. In some embodiments, when light source 232 is used, emission filter 230 is used.

In some embodiments, device 100 can be used with electronic device 50. In some embodiments, electronic device 50 can include components shown related to computer system 2900 shown in FIG. 14. In some embodiments, electronic device 50 can be a portable electronic device that has a camera. For example, in some embodiments, electronic device 50 can be a smartphone, a tablet, or a digital camera. In some embodiments, the electronic device 50 includes a portable electronic device with a camera and light source (e.g., flashlight). Different portable electronic devices can include cameras with different optical designs that result in different focal lengths and image qualities. As discussed above, device 100 can be adjusted in the X, Y, and Z directs allow for positioning of the optical system precisely over the camera or electronic device 50 and at the proper focal length. Accordingly, device 100 can produce adequate imaging quality with various portable electronic devices.

Some biological samples can be degraded or damaged if exposed to elevated temperatures. In some embodiments, device 100 can include an insulating material or thermally conductive material. In some embodiments, the insulating material can limit heat transfer from electronic device 50 to device 100. In some embodiments, the insulating material can limit heat transfer from electronic device 50 such that the temperature within device 100 does not exceed 100° F.

In some embodiments, device 100 includes light sources in addition to illuminator 206. For example, in some embodiments, as shown in FIG. 2A, device 100 can include light source 222. In some embodiments, light source 222 is an LED light. In some embodiments, light source 222 can have various shapes (e.g., square, triangle, or O-shaped). In some embodiments, light source 222 is an O-shaped LED that surrounds at least a portion of lens assembly 210. In some embodiments, light source 222 an LED light that can operate in the visible or UV wavelengths.

In some embodiments, device 100 illuminates a sample using total internal reflection of ambient light by the microscope slide. In some embodiments, device 100 illuminates a sample using reflection of a light from electronic device 50. In some embodiments, device 100 redirects light away from its source, focusing the light at the sample, while completely defocusing (collimating) unscattered light at the camera sensor. In some embodiments, device 100 allows light to travel through illumination tunnels. In some embodiments, the illumination tunnels can have a diameter of less than or equal to 2 inches. In some embodiments, device 100 can be lined with light absorbent material, such as cloth, and can be connected to a moveable base, rotatable around the optical axis, so as to cover a flashlight positioned anywhere on the phone. In some embodiments, brightness can be adjusted using filters, apertures, or using camera software.

In some embodiments, device 100 is configured to magnify the sample up to 400× (e.g., up to 300×, up to 250×, up to 200×, up to 100×). In some embodiments, device 100 can magnify the sample from greater than or equal to 40× to less than or equal to 400×. In some embodiments, device 100 can magnify the sample from greater than or equal to about 40× to less than or equal to about 400×, from greater than or equal to about 75× to less than or equal to about 300×, from greater than or equal to about 100× to less than or equal to about 250×, from greater than or equal to about 150× to less than or equal to about 200×, or within a range having any two of these values as endpoints.

Sperm Analysis

Figure 9:
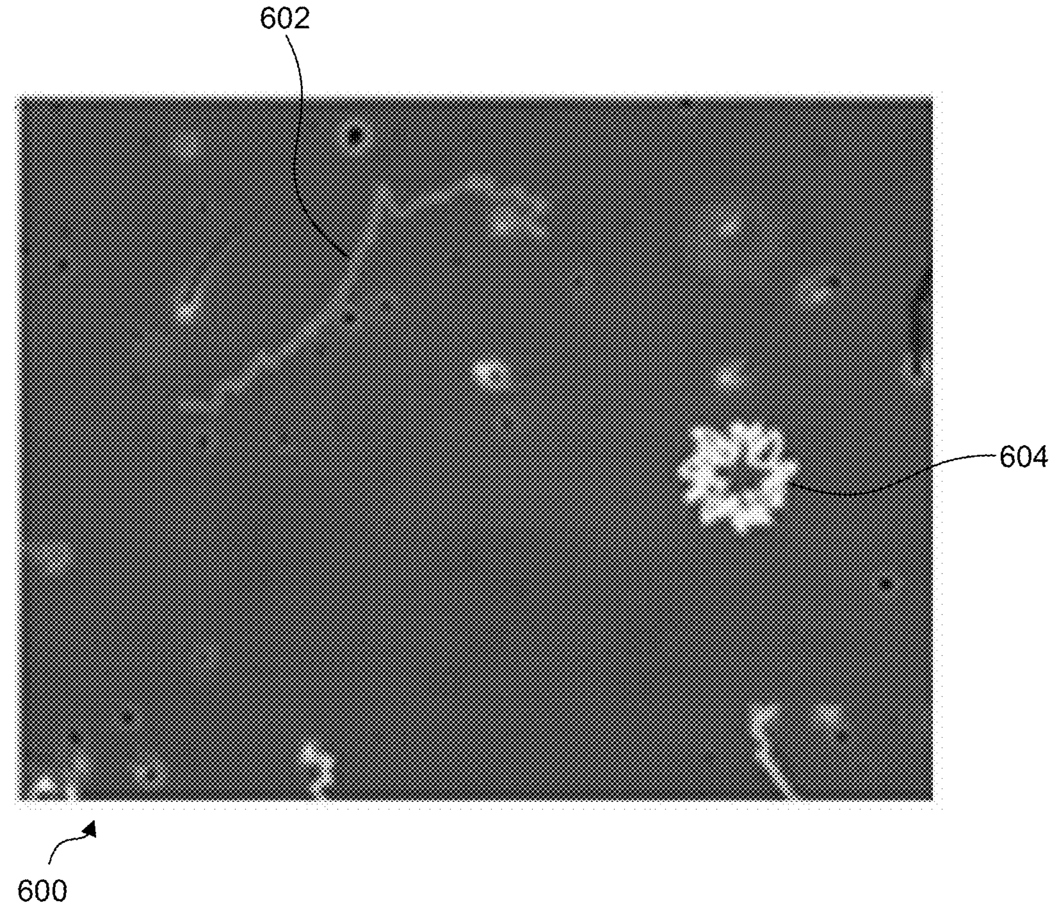
FIG. 9 shows an image of typical sperm movement and atypical sperm movement.

Infertility is a common and complex problem, affecting an estimated 1 in 6 coupes in the United States. Infertility is the inability to conceive after having unprotected sexual intercourse for at least a year. Although many men suffer from infertility, many do not seek reproductive healthcare, often because existing tests require complex clinical pathology analysis and are often costly, inconvenient, and embarrassing. Existing at-home test options have poor reliability, do not offer high-quality imaging, and cannot reliably track sperm. For example, existing at-home test options are typically only able to measure a single parameter (e.g., sperm count or absolute motility). These parameters alone do not adequately characterize sperm health, often leading to false results. Additionally, as illustrated in FIGS. 8A-8D, existing at-home test options cannot provide images suitable for detailed sperm image analysis due to low contrast, insufficient magnification, and poor resolution. Because of this, existing at-home test options often inaccurately measure motility because they fail to account for the intentionality of sperm motion, as illustrated in FIG. 9, and often cannot distinguish cells that are touching or overlapping. For example, image 600 illustrates movement path 602 of a healthy sperm and movement path 604 of an unhealthy sperm. Moreover, existing at-home test options are often not mobile due to size or are not suitable for detailed sperm image.

In certain embodiments a system can be developed to control image capture and post-processing operations: zoom, flash brightness, exposure time, electronic gain, color balance, lossless or high-quality compression. Users will be able to record sample videos at a speed of 30-60 fps with a minimum field of view of 886 pixel×886 pixel. The system can, in certain embodiments, work with unwashed semen which will contain non-sperm cellular debris, immature sperm cells, immotile sperm, and motile sperm. Good contrast makes it possible to distinguish sperm from background, which is necessary for further video analysis.

Accordingly, there is a need for a test that can be easily used at home that can rapidly provide sperm count analysis and consider other factors, such as motility, morphology, volume, and vitality of sperm. The devices disclosed herein (e.g., device 100) can be used to overcome these and other challenges by providing-among other benefits-a compact, lightweight microscope system that can be universally compatible with an electronic device (e.g., a smartphone, a tablet, etc.), provide fine adjustment of the lens in three dimensions, and image a microscopic sample for analysis and detection. Cost-effective prototype of smartphone microscope attachment with even illumination and 1 μm resolution. Table 1 below summarizes the capabilities of devices according to the present embodiments (System A) compared to existing systems (Systems B-F). System B, C, D, E, and F correspond to YO Home Sperm Test, Swim-Count Test, Miera Sperm Test, Trak system, and laboratory systems, respectively.

TABLE 1

| System | A | B | C | D | E | F |
|---|---|---|---|---|---|---|
| Ability to detect sperm count | X | | X | X | X | X |
| Ability to detect pH | X | | | | | X |
| Ability to detect sperm motility | X | | | | | X |
| Ability to detect sperm progressive motility | | | | | | X |
| Ability to detect concentration of motile sperm | X | X | | | | X |

Figure 12:
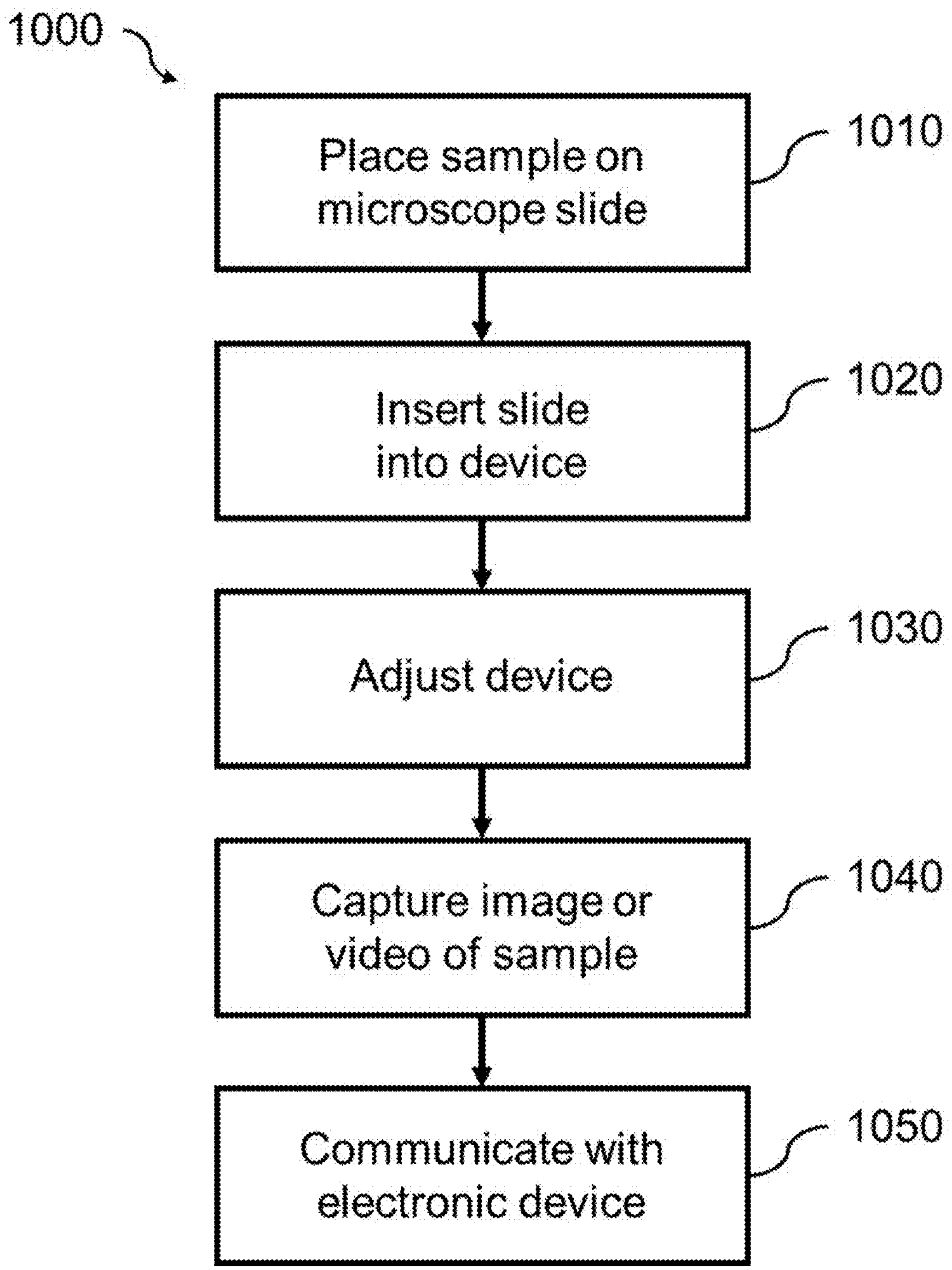
FIG. 12 shows a method according to some embodiments.

Besides the deficit in technology, a major hurdle in point-of-care microscopy is sample preparation. This often involves steps such as mixing reagents and staining cells. In some embodiments, slide 300 is a microfluidic device. FIG. 12 illustrates slide 300. In some embodiments, slide 300 can inlet 302, outlet 304, and at least one chamber 306. In some embodiments, slide 300 is used to hold a semen sample. In some embodiments, the slide 300 is a microfluidic device.

Figure 10:
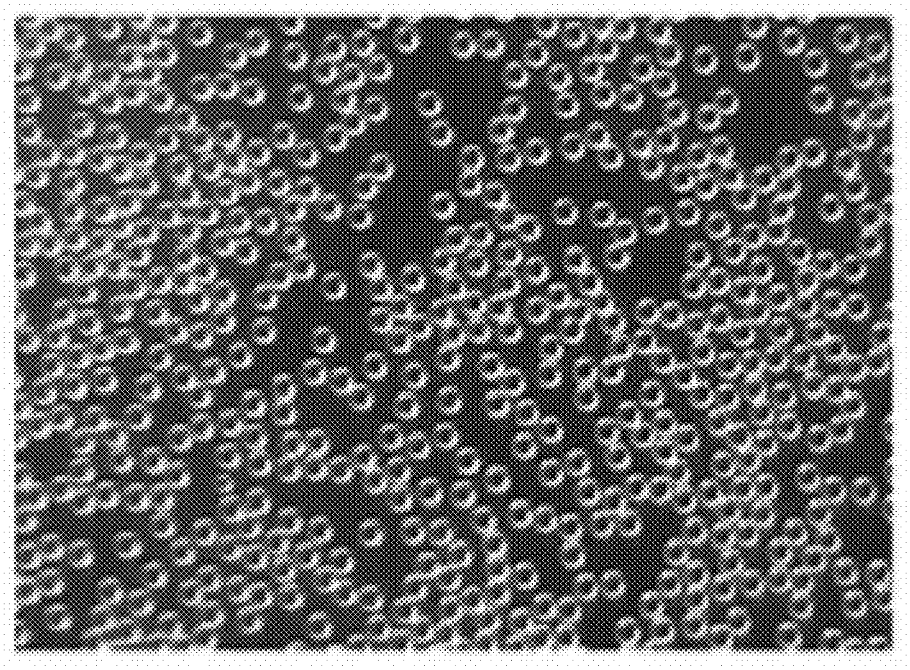
FIG. 10 shows an image captured by a device according to some embodiments.

In some embodiments, device 100 is used for portable and/or at-home sperm testing. FIG. 10 illustrates a sample that has been imaged using embodiments disclosed here. FIG. 10 illustrates an image of microbeads having a diameter of about 10 μm magnified about 250×. Accordingly, as illustrated in FIG. 10, devices (e.g., device 100) according to some embodiments can capture images of microscopic samples using a mobile device.

In some embodiments, device 100 can be used for mobile sperm testing. For example, slide 300 can be a microfluidic device used for analyzing a sperm sample. In some embodiments, a biological sample is loaded into chamber 306. In some embodiments, chamber 306 is a cell counting chamber.

As illustrated in FIG. 12, in some embodiments, a biological sample can be imaged and analyzed according to method 1000. Although method 1000 is discussed in the sequence shown in FIG. 12, it is to be understood that the sequence of method 1000 can be modified. For example, step 1040 could be the first, second, or third step in sequence. In some embodiments, at step 1010, a biological sample can be placed on a microscope slide (e.g., slide 300). In some embodiments, the biological sample is a sperm sample. In some embodiments, at step 1010, the system can detect parameters, such chemical pH analysis, heavy metal detection, electrolyte concentration detection, xenobiotic substance exposure, viability test, tropism analysis, reactivity gradient, urine/blood biomarker detection, osmosis detection, chromatin assay, virus/bacteria analysis, penetration assay, live/dead assay, gene sequence, and apoptosis analysis.

In some embodiments, at step 1020, the microscope slide is inserted into device 100. In some embodiments, at step 1030, device 100 is adjusted to align the biological sample with an optical axis of a camera of an electronic device (e.g., electronic device 50). In some embodiments, device 100 can be adjusted in three dimensions, as discussed above, to position the biological sample, adjust the focus of the lens, adjust brightness of the illuminator, etc.

In some embodiments, at step 1040, device 100 positions a sample in slide 300 so that a camera (e.g., camera 52) of a portable electronic device (e.g., electronic device 50) can capture images and/or video of the biological sample. In some embodiments, at step 1040, device 100 positions a sample in slide 300 so that a more than one camera (e.g., camera 52) of a portable electronic device (e.g., electronic device 50) can capture images and/or video of the biological sample. In some embodiments, at step 1040, device 100 positions a sample in slide 300 so that multiple cameras (e.g., camera 52) of a portable electronic device (e.g., electronic device 50) can capture stereovideos simultaneously.

In some embodiments, at step 1050, device 100 communicates with an electronic device (e.g., electronic device 50). In some embodiments, device 100 communicates with electronic device 50 by internet, wired connection, Wi-Fi, or Bluetooth technology. In some embodiments, electronic device 50 can include a cell detection and tracking algorithm for detecting male fertility parameters, such as electrical conductivity, mitochondria analysis, physical Infrared Spectroscopy, microfluidics, mass scale, flow cytometry analysis, hemo cytometry assay, spectroscopy, mechanical property test, size scale, digital computer aided sperm assay, microscopy imaging, clinical medical history analysis/chronic disease relevance, habits and living environment analysis (e.g. smoking, drinking, daily exposure to ionizing radiation).

In some embodiments, device 100 and/or electronic device 50 can include a processor configured to convert the visual readout to a numerical value related to the information sought—for example, information about the biological sample. In some embodiments, the processor is configured to analyze low-quality images of densely-populated, overlapping, irregularly-moving cells outputs a rating according to the World Health Organization (WHO) male fertility parameters discussed above.

Contaminant Analysis

Contaminants, such as microorganisms and microplastics, can be found in many different substances, from soil to drinking water to the products consumers use. For example, microplastics in the ocean have been found to come from various sources, such as synthetic textiles, car tires, city dust, road markings, marine coatings, personal care products, and plastic pellets. This can create issues for humans because marine life can consume these microplastics, and that marine life can sometimes be used as food for human consumption. Microplastics can be found in various consumer products. For example, Table 2 illustrates the average number of microplastics particles found in various products.

TABLE 2

| Product | Number of microplastics |
|---|---|
| Bottled water | 94.37 per liter |
| Beer | 32.27 per liter |
| Air | 9.80 per liter |
| Tap water | 4.24 per liter |

TABLE 2-continued

| Product | Number of microplastics |
|---|---|
| Seafood | 1.48 per gram |
| Sugar | 0.44 per gram |
| Salt | 0.11 per gram |
| Honey | 0.10 per gram |

Figure 11:
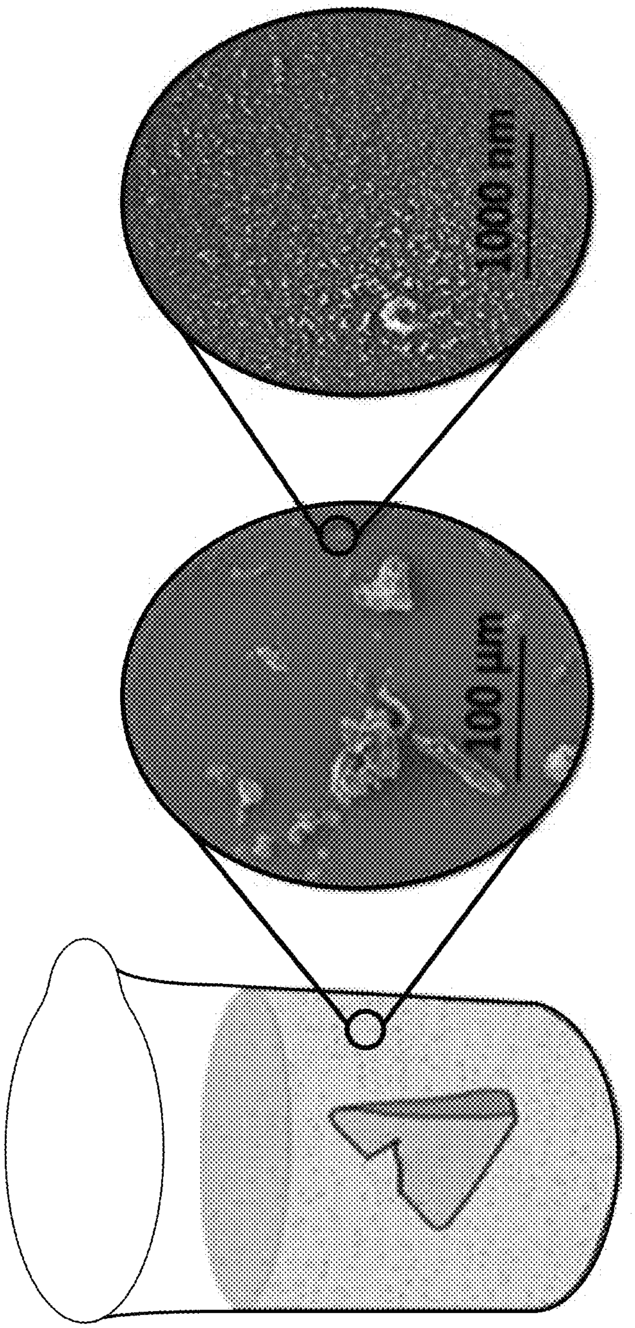
FIG. 11 shows microplastics detected according to some embodiments.

It is estimated that each person consumes hundreds of thousands of microplastic particles per year. Microplastics can have an average size of 100 μm or less (e.g., 1000 nm or less). FIG. 11 illustrates microplastics detected in a plastic teabag steeped at 95° C. As discussed above, existing systems are not able to capture high-quality images that can be used for analysis in a mobile and cost-friendly manner. Additionally, there is a need to be able to detect microplastics in the field, for example when evaluating water quality or soil quality. Systems according to some embodiments overcome these challenges by providing—among other benefits—a portable device that can capture an image of contaminants or microplastics for analysis. For example, the images can be of sufficient quality to allow for detection and analysis of microplastics having a size of 100 μm or less (e.g., 1000 nm or less). In some embodiments, the images can be of sufficient quality to allow for detection and analysis of microplastics having a size of greater than or equal to 2 μm to less than or equal to 100 μm or greater than or equal to 5 μm to less than or equal to 100 μm.

In some embodiments, devices (e.g., device 100) according to some embodiments can be used to analyze liquid or solid samples for contaminants, including microorganisms and microplastics. In some embodiments, a contaminant or microplastic can be imaged and analyzed according to method 1000 discussed above. In some embodiments, a contaminant or microplastic sample is processed before method 1000 is performed.

Figure 13:
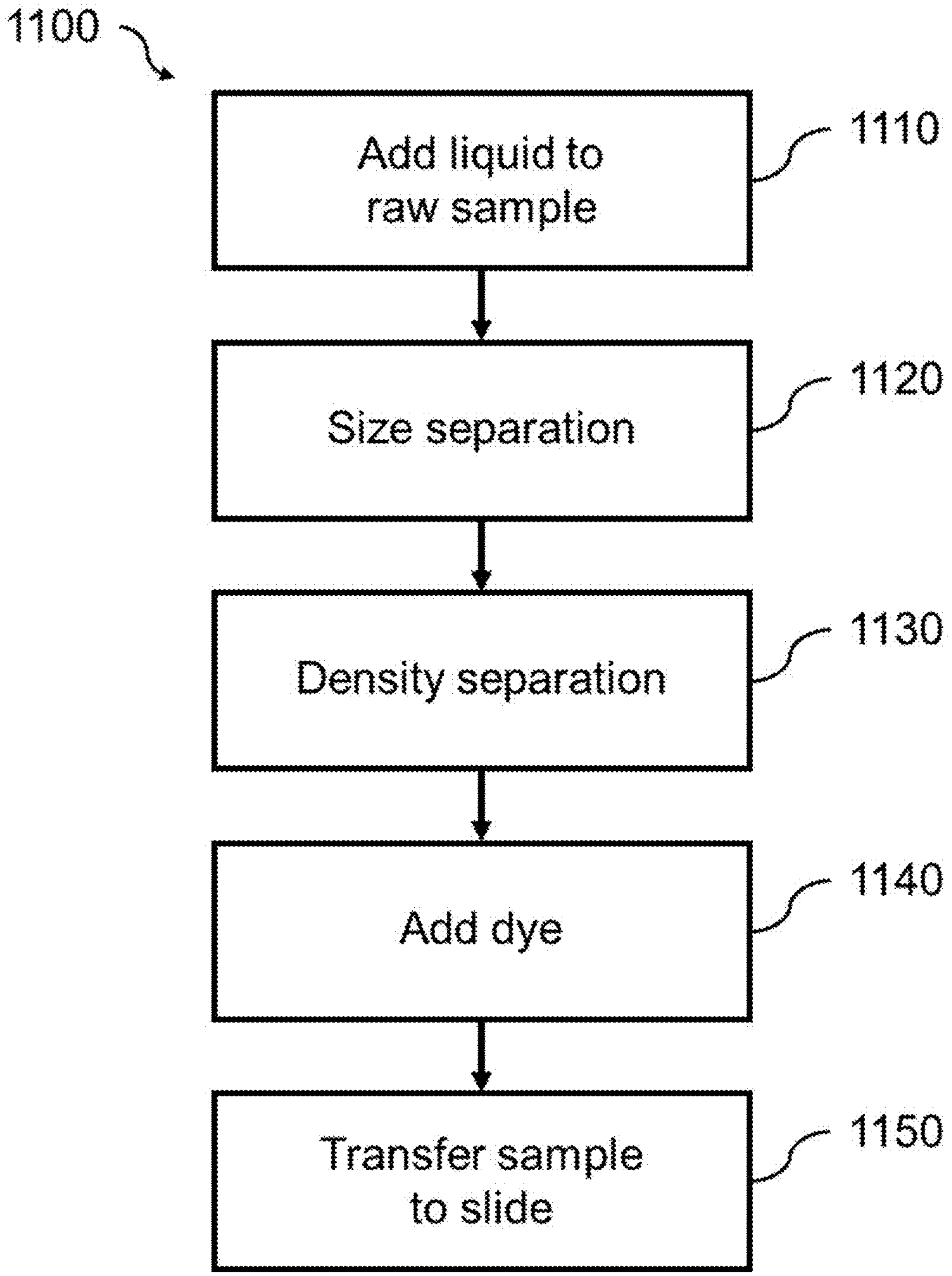
FIG. 13 shows a method according to some embodiments.

As illustrated in FIG. 13, in some embodiments, the sample can be processed according to method 1100. In some embodiments, at step 1110, a liquid is added to a raw sample (e.g., contaminant or microplastic) to form a mixture. In some embodiments, the liquid comprises water, hydrogen peroxide, enzymes (e.g., chitinase, ligninase, or cellulase), potassium hydroxide, nitric acid, Creon, Trisma, or combinations thereof. In some embodiments, the liquid comprises a Fenton's reagent. In some embodiments, the Fenton's reagent comprises hydrogen peroxide and a ferrous iron (e.g., $FeSO_4$). In some embodiments, the liquid dissolves organic material in the sample.

In some embodiments, at step 1120, the mixture formed at step 1110 can be separated by size, for example by filtering. In some embodiments, the mixture is passed through a filter to form a filtered mixture. In some embodiments, the mixture is passed through a first filter having a pore size greater than or equal 50 μm. In some embodiments, the mixture is then passed through as second filter having a pore size of 5 μm such that particles components having a size of less than 5 μm pass through the filter to form a first portion having particles less than 5 μm and a second portion having particles greater than 5 μm. In some embodiments, the second portion is the filtered mixture containing the contaminant (e.g., microplastics). In some embodiments, a pressure (e.g., a positive pressure) can be applied to the filter to separate the filtered mixture containing the contaminant from the filter. In some embodiments, a syringe can be used to apply the positive pressure to force liquid through the filter. In some embodiments, the filter can be vibrated to separate the filtered mixture containing the contaminant from the filter. In some embodiments, the pressure can be applied to separate the contaminant from the filter.

In some embodiments, at step 1130, the filtered mixture formed at step 1120 can be separated by density. In some embodiments, the density separation comprises adding a salt to the filtered mixture, which can cause the contaminants or microplastics to float to the top of the filtered mixture, creating a supernatant first fraction that is rich in contaminants or microplastics, and a second fraction. In some embodiments, the salt is added to the filtered mixture until saturation. In some embodiments, the salt comprises sodium iodide, zinc chloride, sodium chloride, potassium iodide, or combinations thereof.

In some embodiments, at step 1140, a dye can be added to dye the second fraction that includes contaminants or microplastics. In some embodiments, the dye includes Nile Red (preferred), Calcofluor white, Evans blue, methylene blue, clothing dye, DAPI, rose bengal, or combinations thereof. In some embodiments, adding the dye helps image particles that may be clear or otherwise mistaken for debris. In some embodiments, the dye dyes only particles, making them more visible under excitation and/or LED light).

In some embodiments, at step 1150, the supernatant can be concentrated and transferred to a slide 300 (e.g., a haemocytometer).

Computer Device

Figure 14:
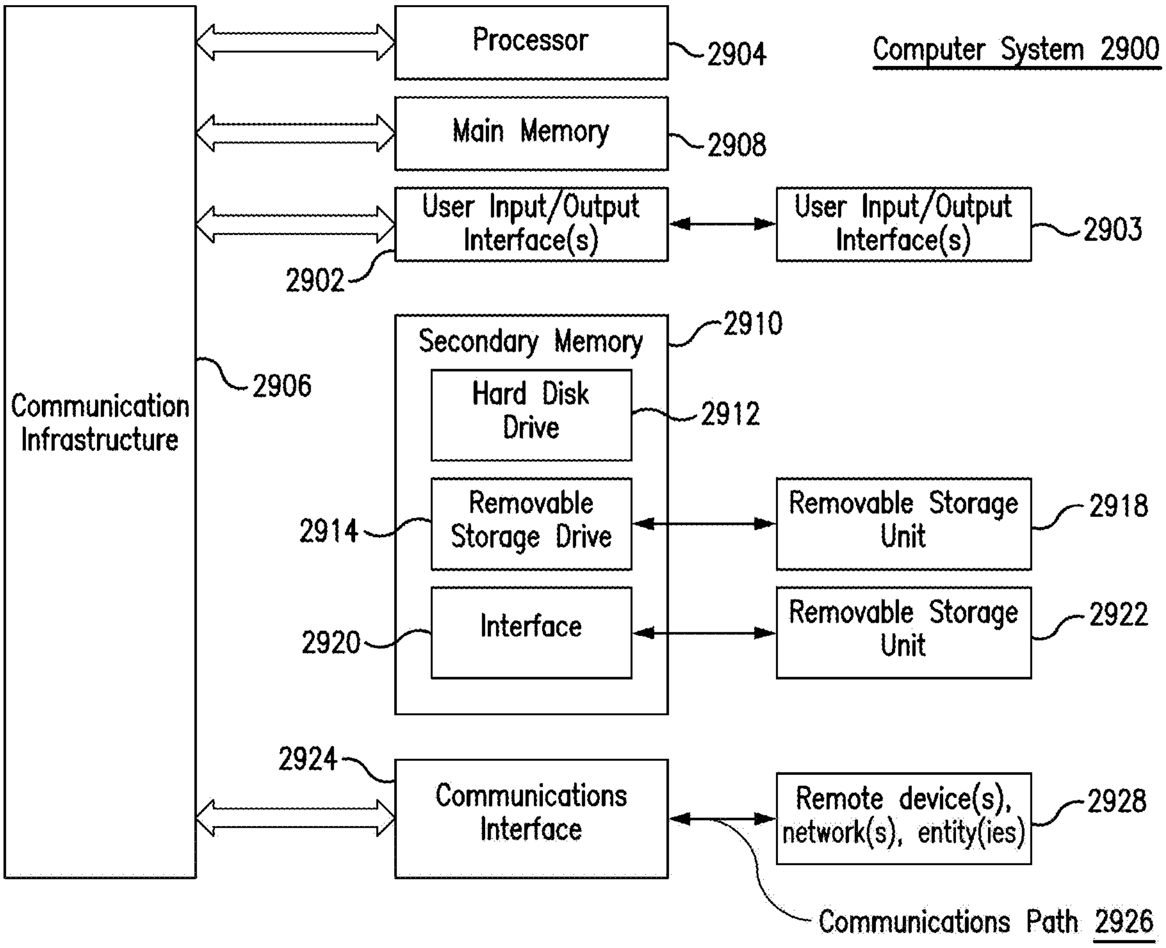
FIG. 14 shows an example computer system used with systems and methods according to some embodiments.

Various embodiments may be implemented, for example, using one or more well-known computer systems, such as computer system 2900 shown in FIG. 14. One or more computer systems 2900 may be used, for example, to implement any of the embodiments discussed herein, as well as combinations and sub-combinations thereof.

Computer system 2900 may include one or more processors (also called central processing units, or CPUs), such as a processor 2904. Processor 2904 may be connected to a communication infrastructure or bus 2906.

Computer system 2900 may also include user input/output device(s) 2903, such as monitors, keyboards, pointing devices, etc., which may communicate with communication infrastructure 2906 through user input/output interface(s) 2902.

One or more processors 2904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2900 may also include a main or primary memory 2908, such as random access memory (RAM). Main memory 2908 may include one or more levels of cache. Main memory 2908 may have stored therein control logic (i.e., computer software) and/or data.

Computer system 2900 may also include one or more secondary storage devices or memory 2910. Secondary memory 2910 may include, for example, a hard disk drive 2912 and/or a removable storage device or drive 2914. Removable storage drive 2914 may be a floppy disk drive, a magnetic tape drive, a compact disk drive, an optical storage device, tape backup device, and/or any other storage device/drive.

Removable storage drive 2914 may interact with a removable storage unit 2918. Removable storage unit 2918 may include a computer-usable or readable storage device having stored thereon computer software (control logic) and/or data. Removable storage unit 2918 may be a floppy disk, magnetic tape, compact disk, DVD, optical storage disk, and/any other computer data storage device. Removable storage drive 2914 may read from and/or write to removable storage unit 2918.

Secondary memory 2910 may include other means, devices, components, instrumentalities or other approaches for allowing computer programs and/or other instructions and/or data to be accessed by computer system 2900. Such means, devices, components, instrumentalities, or other approaches may include, for example, a removable storage unit 2922 and an interface 2920. Examples of the removable storage unit 2922 and the interface 2920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2900 may further include a communication or network interface 2924. Communication interface 2924 may enable computer system 2900 to communicate and interact with any combination of external devices, external networks, external entities, etc. (individually and collectively referenced by reference number 2928). For example, communication interface 2924 may allow computer system 2900 to communicate with external or remote devices 2928 over communications path 2926, which may be wired and/or wireless (or a combination thereof), and which may include any combination of LANs, WANs, the Internet, etc. Control logic and/or data may be transmitted to and from computer system 2900 via communication path 2926.

Computer system 2900 may also be any of a Personal Digital Assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 2900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), Data Center as a service (DCaaS), software as a service (SaaS), managed software as a service (MSaaS), platform as a service (PaaS), desktop as a service (DaaS), Function as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 2900 may be derived from standards including but not limited to JavaScript Object Notation (JSON), Extensible Markup Language (XML), Yet Another Markup Language (YAML), Extensible HyperText Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 2900, main memory 2908, secondary memory 2910, and removable storage units 2918 and 2922, as well as tangible articles of manufacture embodying any combination of the foregoing. Such control logic, when executed by one or more data processing devices (such as computer system 2900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 14. In particular, embodiments can operate with software, hardware, and/or operating system implementations other than those described herein.

As used herein, the terms "top" and "bottom," and the like are intended to assist in understanding of embodiments of the disclosure with reference to the accompanying drawings with respect to the orientation of device 100 as shown, and are not intended to be limiting to the scope of the disclosure or to limit the disclosure scope to the embodiments depicted in the Figures. The directional terms are used for convenience of description and it is understood that device 100 may be positioned in any of various orientations.

As used herein, the term "about" refers to a value that is within ±10% of the value stated. For example, about 100 μm can include any number between 90 μm and 100 μm. That said, if a percentage is listed and the value of that percentage cannot go above 100%, for example 100 wt % or 99 wt %, "about" does not modify the percentage to include values over 100%.

It is to be appreciated that the Detailed Description section, and not any other section, is intended to be used to interpret the claims. Other sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above examples are illustrative, but not limiting, of the present disclosure. Other suitable modifications and adaptations of the variety of conditions and parameters normally encountered in the field, and which would be apparent to those skilled in the art, are within the spirit and scope of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described exemplary embodiments, but should be defined only in accordance with the claims and their equivalents.

What is claimed is:

1. An apparatus for analyzing a sample, the apparatus comprising:

- a support structure, the support structure comprising a first side having a length extending along a first axis in a first direction, a second side extending along a second axis in a second direction that is perpendicular to the first direction, and a third side parallel to the second side; and
- a microscope assembly coupled to the support structure, the microscope assembly comprising:
  - a housing,
  - a lens, a light source, and a collimator disposed within the housing,
  - an adjusting member configured to adjust the position of the lens within the housing, and
  - an opening defined in the housing, the opening configured to receive at least a portion of a microscope slide, the microscope slide configured to receive the sample,
- wherein the microscope assembly is movable between a first position and a second position along the support structure,
- wherein the apparatus is portable and configured to couple to a portable electronic device that has a camera, and
- wherein the microscope assembly is configured to magnify the sample.

2. The apparatus of claim 1, wherein the microscope assembly is movable to a third position between the first position and the second position, wherein the third position aligns with an optical axis of the camera.

3. The apparatus of claim 2, wherein the housing is configured to move in the direction of the optical axis from the third position to a fourth position for fine adjustment of the lens.

4. The apparatus of claim 3, further comprising a motor configured to move the microscope assembly along the support structure.

5. The apparatus of claim 1, wherein the collimator is oriented along an optical axis and disposed between the first side of the support structure and the light source.

6. The apparatus of claim 5, further comprising a polarizer.

7. The apparatus of claim 1, further comprising an emission filter.

8. The apparatus of claim 1, further comprising an LED light that radially surrounds at least a portion of the lens.

9. The apparatus of claim 1, wherein the light source comprises an illuminator, wherein the illuminator is oriented along a third axis that is parallel to the first axis and perpendicular to an optical axis of the camera, and wherein the collimator is oriented perpendicular to the optical axis.

10. The apparatus of claim 9, further comprising a mirror oriented at an angle relative to the third axis and to the optical axis.

11. The apparatus of claim 1, wherein the third side is movable along the first side between a first position and a second position, wherein the distance between the second side and the third side is larger in the first position than in the second position.

12. The apparatus of claim 11, wherein the second side and the third side are configured to releasably couple to the portable electronic device by a clamp, a clip, an adhesive, a magnet, an elastic holder, or combinations thereof.

13. The apparatus of claim 1, further comprising a darkfield stop.

14. The apparatus of claim 1, wherein the light source comprises a diffuser.

15. The apparatus of claim 1, wherein the microscope assembly further comprises an aperture configured to adjust the brightness of the light.

16. An apparatus for analyzing a sample, the apparatus comprising:

- a support structure, the support structure comprising a first wall extending along a first axis in a first direction and a second wall extending along a second axis in a second direction that is perpendicular to the first direction, wherein the second wall is configured to couple the apparatus to a portable electronic device that has a camera; and
- a microscope assembly coupled to the support structure, the microscope assembly comprising:
  - a housing;
  - a lens, a light source, and a collimator disposed within the housing;
  - an opening defined in the housing;
  - an adjusting member,
    - wherein the adjusting member is configured to adjust the position of the lens relative to the first axis and the second axis within the housing of the microscope assembly, or
    - wherein the adjusting member is configured to adjust the position of a microscope slide at least partially received within the opening and,
- wherein the microscope assembly is movable between a first position and a second position along the support structure,
- wherein the microscope assembly is configured to magnify the sample, and
- wherein the apparatus is portable.

17. The apparatus of claim 16, wherein the apparatus is configured to wirelessly communicate with the portable electronic device.

18. The apparatus of claim 16, wherein the microscope assembly further comprises an aperture configured to adjust the brightness of the light.

19. The apparatus of claim 18, further comprising a darkfield stop.

20. An apparatus for analyzing a sample, the apparatus comprising:

- a support structure, the support structure comprising:
  - a first side extending in a first direction, the first side comprising an opening extending in the first direction,
  - a second side extending in a second direction that is perpendicular to the first direction, and
  - a third side parallel to the second side; and
- a microscope assembly coupled to the support structure, the microscope assembly comprising:
  - a housing, and
  - a lens, a light source, and a collimator disposed within the housing,
- wherein the lens is moveable within the housing in the second direction, or
- wherein the microscope assembly is configured to move a microscope slide at least partially received within the microscope assembly and,
- wherein a portion of the housing extends through the opening of the first side such that the microscope assembly is movable between a first position and a second position along the first side of the support structure,
- wherein the support structure is configured to releasably attach to a portable electronic device that has a camera,
- wherein the microscope assembly is configured to magnify the sample, and
- wherein the apparatus is portable.

21. The apparatus of claim 20, wherein the portion of the housing is configured to slide within the opening.

22. A system for analyzing a sample, the system comprising:

- a microscope assembly comprising:
  - a housing comprising walls defining an internal volume,
  - a lens assembly comprising a plurality of lenses, a light source, an illuminator, a collimator, and a processor disposed within the volume of the housing,
  - a slot defined in the housing, and
  - an adjusting member configured to adjust the position of a lens of the plurality of lenses within the housing of the microscope assembly or to adjust the position of a microscope slide at least partially received within the slot; and
- a camera configured to capture an image of a magnified sample,
- wherein the system is portable.

23. The system of claim 22, further comprising a portable electronic device, the portable electronic device comprising the camera.

24. The system of claim 22, wherein the illuminator is offset from an optical axis.

25. The system of claim 22, wherein the microscope assembly is configured to illuminate the sample via at least two of epi-illumination, transillumination, oblique illumination, light-guided illumination, fluorescent illumination, or UV illumination.

26. The system of claim 22, wherein the microscope slide is movable relative to an optical axis to at least partially focus the sample.

27. The apparatus of claim 1, wherein the adjusting member comprises an actuator extending through a wall of the housing.

28. The apparatus of claim 1, wherein the adjusting member comprises a first actuator configured to adjust the position of the lens within the housing along the first axis, and

- wherein the adjusting member further comprises a second actuator configured to adjust the position of the lens within the housing along the second axis.

29. The apparatus of claim 28, wherein the adjusting member further comprises a third actuator configured to adjust the position of the lens within the housing along a third axis that is parallel to the first axis and perpendicular to an optical axis of the camera.

30. The apparatus of claim 1, wherein a volume of the housing is less than or equal to 16 $in^3$.

* * * * *